(12) United States Patent
Lai

(10) Patent No.: US 7,362,390 B2
(45) Date of Patent: Apr. 22, 2008

(54) LIQUID CRYSTAL DISPLAY PANEL AND THIN FILM TRANSISTOR ARRAY

(75) Inventor: Han-Chung Lai, Taoyuan Hsien (TW)

(73) Assignee: Au Optronics Corporation, Hsinchu (TW)

( * ) Notice: Subject to any disclaimer, the term of this patent is extended or adjusted under 35 U.S.C. 154(b) by 495 days.

(21) Appl. No.: 10/904,476

(22) Filed: Nov. 12, 2004

(65) Prior Publication Data

US 2006/0023136 A1 Feb. 2, 2006

(30) Foreign Application Priority Data

Jul. 29, 2004 (TW) .............................. 93122690 A

(51) Int. Cl.
*G02F 1/1368* (2006.01)
*G02F 1/1337* (2006.01)
*G02F 1/1343* (2006.01)
*G02F 1/139* (2006.01)

(52) U.S. Cl. .................... 349/39; 349/43; 349/110; 349/129; 349/143

(58) Field of Classification Search ............. 349/37, 349/38, 39, 42, 43, 110, 128, 129, 130, 139, 349/143; 345/89, 92; 257/59, 72
See application file for complete search history.

(56) References Cited

U.S. PATENT DOCUMENTS

| 6,614,492 B1* | 9/2003 | Song ........................... 349/38 |
| 2003/0206262 A1* | 11/2003 | Kim et al. ................. 349/129 |
| 2004/0075798 A1* | 4/2004 | Inoue et al. ................ 349/129 |

OTHER PUBLICATIONS

Sarma et al., MVA-AM LCD Development For Avionic Applications, no publication date.

* cited by examiner

*Primary Examiner*—Toan Ton
*Assistant Examiner*—Tai Duong
(74) *Attorney, Agent, or Firm*—Jianq Chyun IP Office

(57) ABSTRACT

A thin film transistor array comprising a plurality of common lines for providing the storage capacitance of pixels is provided. In particular, each of the common lines comprises a plurality of branches. Wherein, the common line and the branches thereof, and the pixel electrode constitute the storage capacitor. The branches are disposed at pixels where the luminance quality is bad. Therefore, the storage capacitance of the pixels can be enhanced without altering the aperture ratio of the pixels. Accordingly, the performance of the liquid crystal display panel can be improved.

9 Claims, 16 Drawing Sheets

LIQUID CRYSTAL DISPLAY PANEL AND THIN FILM TRANSISTOR ARRAY

CROSS-REFERENCE TO RELATED APPLICATION

This application claims the priority benefit of Taiwan application serial no. 93122690, filed Jul. 29, 2004.

BACKGROUND OF THE INVENTION

1. Field of the Invention

The present invention relates to a display apparatus, and more particularly, to a liquid crystal display panel, a thin film transistor array capable of enhancing storage capacitance thereof and a capacitor structure.

2. Description of the Related Art

The rapid development of semiconductor and display technologies has opened the door to a multi-media society. Among display apparatus, thin film transistor liquid crystal displays (TFT-LCDs) have such advantages as high image quality, excellent space-efficiency, low power consumption and non-radiation and have gradually dominated the display market.

A TFT-LCD mainly comprises a thin film transistor array, a color filter and a liquid crystal layer. Wherein, the thin film transistor array comprises a plurality of thin film transistors arranged in an array and pixel electrodes corresponding thereto. The thin film transistors serve as switches of liquid crystal display units. In order to control the pixel units, scan lines and data lines are used to select specific pixels. By providing proper operating voltages to the pixels, the data corresponding to the pixels are displayed. In addition, a partial area of the said pixel electrode covers the scan line or the common line to form a storage capacitor. Conventional storage capacitors include the metal-insulator-metal (MIM) capacitor and the metal-insulator-ITO (MII) capacitor. What follows are descriptions of these two capacitors.

FIG. 1 is a cross sectional view showing a conventional MIM storage capacitor. As shown in FIG. 1, the conventional MIM storage capacitor Cst comprises the scan line or common line 100, and the top electrode 120. In the MIM storage capacitor, the scan line or common line 100 and the top electrode 120 are kept isolated by the gate insulator 110. The pixel electrode 140 is electrically connected to the top electrode 120 through the opening 132 in the protection layer 130.

FIG. 2 is a cross sectional view showing a conventional MII storage capacitor. In FIG. 2, the conventional MII storage capacitor Cst comprises the scan line or common line 200, and the top electrode 230. Compared with the MIM storage capacitor, the MII storage capacitor has such structure that the scan line or common line 220 is isolated from the pixel electrode 230 by the gate insulator 210 and the protection layer 220.

Generally, higher aperture ratio will bring in better luminance quality. In another aspect, larger capacitance of the capacitor Cst will result in better photo-electric efficiency of the liquid crystal display. However, in the pixel structure of the conventional liquid crystal display, if the area of the common line is enlarged to increase capacitance Cst, the aperture ratio of the pixel structure will be reduced. To increase the capacitance of the storage capacitor Cst without altering the aperture ratio, the thickness of the gate insulator 210 and/or the protection layer 220 needs to be reduced.

However, a thinned-out gate insulator 210 and/or protection layer 220 may damage the reliability of the thin film transistors.

In addition, particles may fall in the gate insulator and/or the protection layer or cracks may be formed therein due to flaws during the manufacturing process, which will ultimately lead to charge leakage. As a result, the performance of pixels of the display panel is impaired and the display quality is brought down.

SUMMARY OF THE INVENTION

Accordingly, the present invention is directed to a thin film transistor array for preventing charge leakage of capacitors due to the pollution of particles and for enhancing the capacitance of capacitors to improve the performance of liquid crystal display panels, without altering the aperture ratio and reliability of transistors.

In the present invention, a thin film transistor array is provided which, along with a color filter and a liquid crystal layer, constitutes a liquid crystal display panel. Wherein, a plurality of patterns is disposed over the color filter. The thin film transistor array comprises a substrate, a plurality of scan lines, a plurality of data lines, a plurality of thin film transistors, a plurality of pixel electrodes and a plurality of common lines. A plurality of pixels is defined by the scan lines and the data lines. The patterns are disposed in a corresponding position to these pixels.

Following the above paragraph, each of the thin film transistors and each of the pixel electrodes are disposed in a one of the pixels, wherein the thin film transistors are driven by the plurality of scan lines and of the data lines. The plurality of pixel electrodes is electrically connected in response to one of the thin film transistors. Each of the common lines is disposed between two adjacent scan lines. In particular, each of the common lines comprises a plurality of first branches, wherein each of the pixel electrodes covers at least one of the first branches, and each of the first branches is disposed in response to one of the patterns.

In the present invention, a is liquid crystal display panel comprising a color filter, a thin film transistor array and a liquid crystal layer is provided. Wherein, a plurality of patterns is disposed over the color filter. The thin film transistor array comprises a substrate, a plurality of scan lines, a plurality of data lines, a plurality of thin film transistors, a plurality of pixel electrodes and a plurality of common lines. A plurality of pixels is defined by the scan lines and the data lines. The patterns are disposed in a corresponding position to these pixels.

Following the above paragraph, each of the thin film transistors and each of the pixel electrodes are disposed in a one of the pixels, wherein the thin film transistors are driven by the plurality of scan lines and of the data lines. The plurality of pixel electrodes is electrically connected in response to one of the thin film transistors. Each of the common lines is disposed between two adjacent scan lines. In particular, each of the common lines comprises a plurality of first branches, wherein each of the pixel electrodes covers at least one of the first branches, and each of the first branches is disposed in response to one of the patterns.

According to an embodiment of the present invention, the thin film transistor array further comprises a plurality of top electrodes. Each of the top electrodes is disposed between the pixel electrodes and the common lines, and a part of the top electrodes is electrically connected to the corresponding pixel electrodes. In another embodiment, each of the common lines further comprises a plurality of second branches.

The second branches are disposed adjacent to the edge of the pixels and in a corresponding position to, for example, black matrixes of the color filter. In still another embodiment, each of the pixel electrodes has a second slit. The first branches, for example, are disposed away from the second slit.

According to an embodiment of the present invention, the thin film array transistor further comprises a gate insulator disposed over the substrate, covering the scan lines, the common lines and the branches. In addition, the thin film transistor array further comprises a protection layer covering, for example, the data lines and the top electrodes.

According to an embodiment of the present invention, the patterns, for example, are protrusions or first slits. In another embodiment, the patterns comprise the protrusions and the first slits both.

In the present invention, a capacitor structure is provided for integrating in a pixel unit. The capacitor structure comprises a substrate, a pixel electrode, a gate insulator and a common line. The common line disposed over the substrate and comprises a plurality of first branches. The gate insulator disposed on the common line. The pixel electrode disposed over the gate insulator.

According to an embodiment of the present invention, the capacitor structure further comprises a protection layer disposed between the gate insulator and the pixel electrode. In other embodiment of the present invention, the capacitor structure further comprises a top electrode disposed between the gate insulator and the protection layer, wherein the protection layer has an opening, and the top electrode and the pixel electrode is electrically contact via the opening.

In the present invention, the branches of the common lines are used to increase the capacitance of the capacitors such that the performance of the liquid crystal display panels can be improved. Therefore, even if the area of the common lines is reduced, the capacitance lost due to the reduced area of the common lines can be compensated by the capacitance of capacitors comprising the branches and the pixel electrodes. Therefore, in the present invention, capacitance leakage between the common lines and the pixel electrodes can be prevented.

The above and other features of the present invention will be better understood from the following detailed description of the embodiments of the invention that is provided in combination with the accompanying drawings.

DESCRIPTION OF THE EMBODIMENTS

In the present invention, the common lines with the branches are used to enhance capacitance. Wherein, these branches of the common lines are disposed in corresponding positions to pixels where the luminance quality is bad to reduce the impact on the aperture ratio. What follows are descriptions of some embodiments in the present invention.

Figure 3:
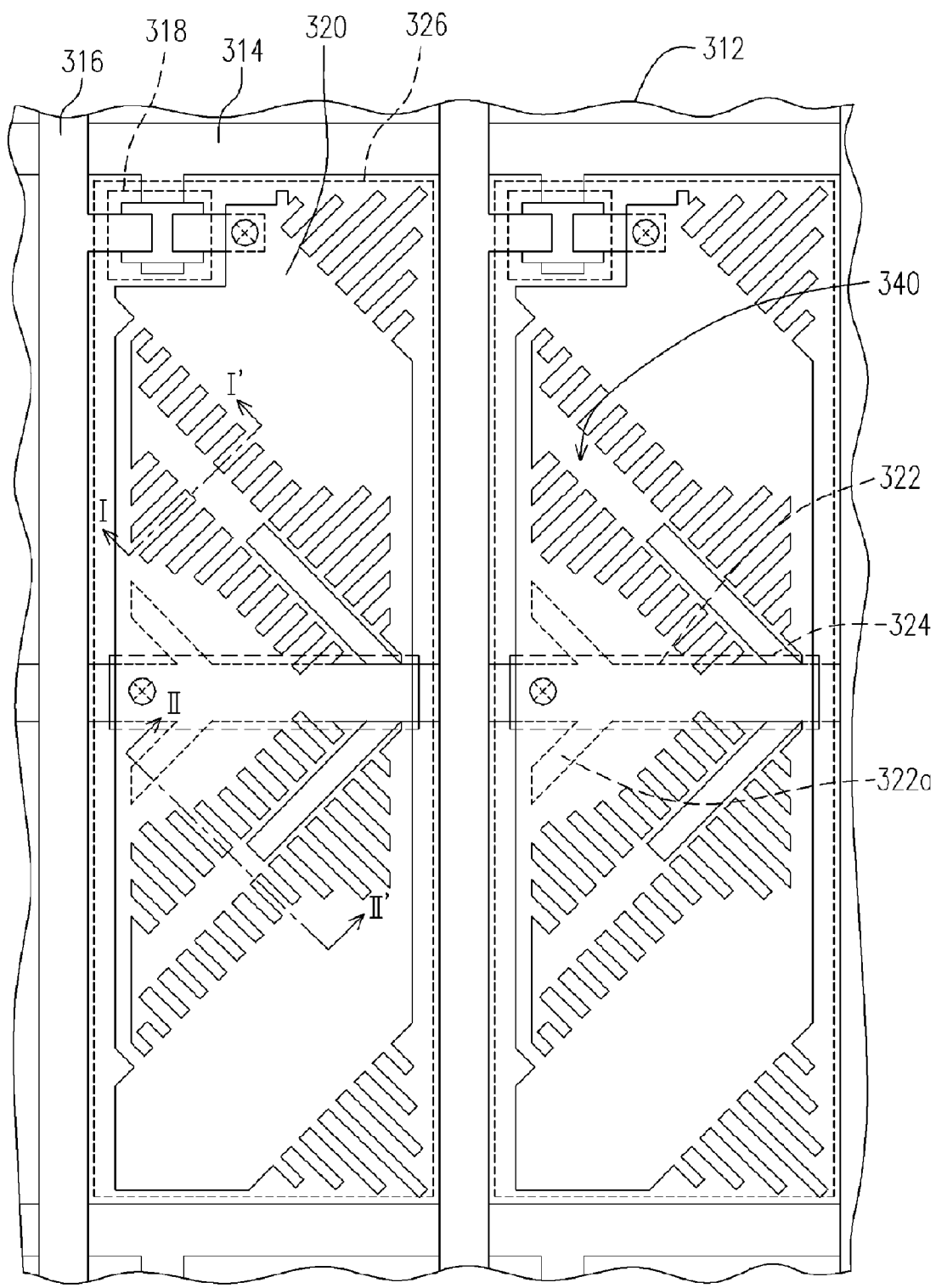
FIG. 3 is a schematic top view showing a partial thin film transistor array of an embodiment of the present invention.
Figure 4:
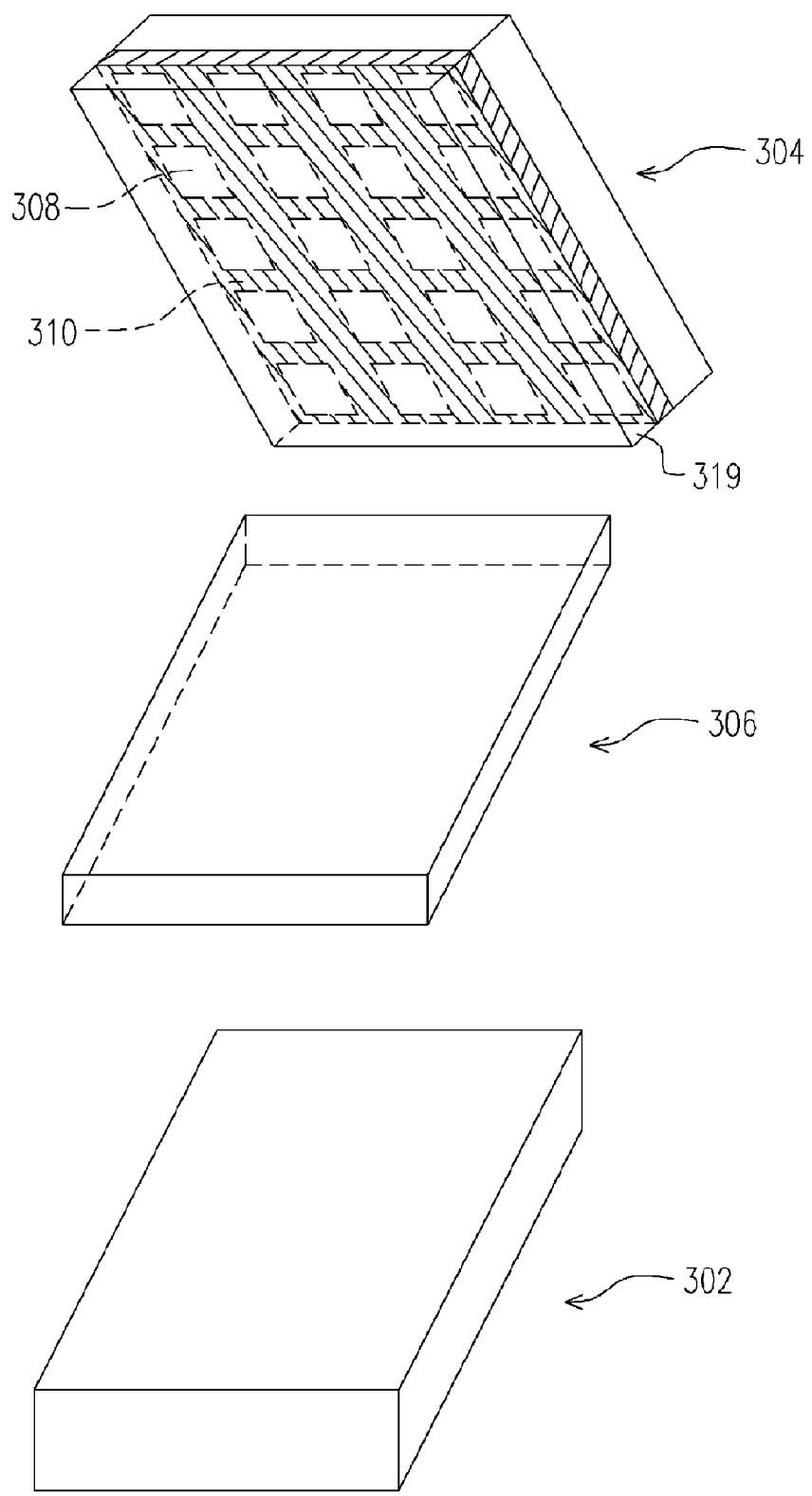
FIG. 4 is a schematic configuration showing a decomposed Multi-Domain Vertical Alignment (MVA) liquid crystal display panel comprising the thin film transistor array in FIG. 3 according to an embodiment of the present invention.

FIG. 3 is a schematic top view showing a partial thin film transistor array according to an embodiment of the present invention. FIG. 4 is a schematic configuration showing a decomposed Multi-Domain Vertical Alignment (MVA) liquid crystal display panel comprising the thin film transistor array in FIG. 3 according to an embodiment of the present invention. As shown in FIG. 4, the thin film transistor array 302, the color filter 304 and the liquid crystal layer 306 constitute the MVA liquid crystal display panel 300. Wherein, the liquid crystal layer 306 comprises a plurality of liquid crystal molecules (not shown). The color filter 304 comprises a plurality of color filter films 308, a black matrix 310 and a common electrode 319, and the common electrode 319 has patterns for changing the electrically field formed thereon (not shown in FIG. 4).

Figure 5:
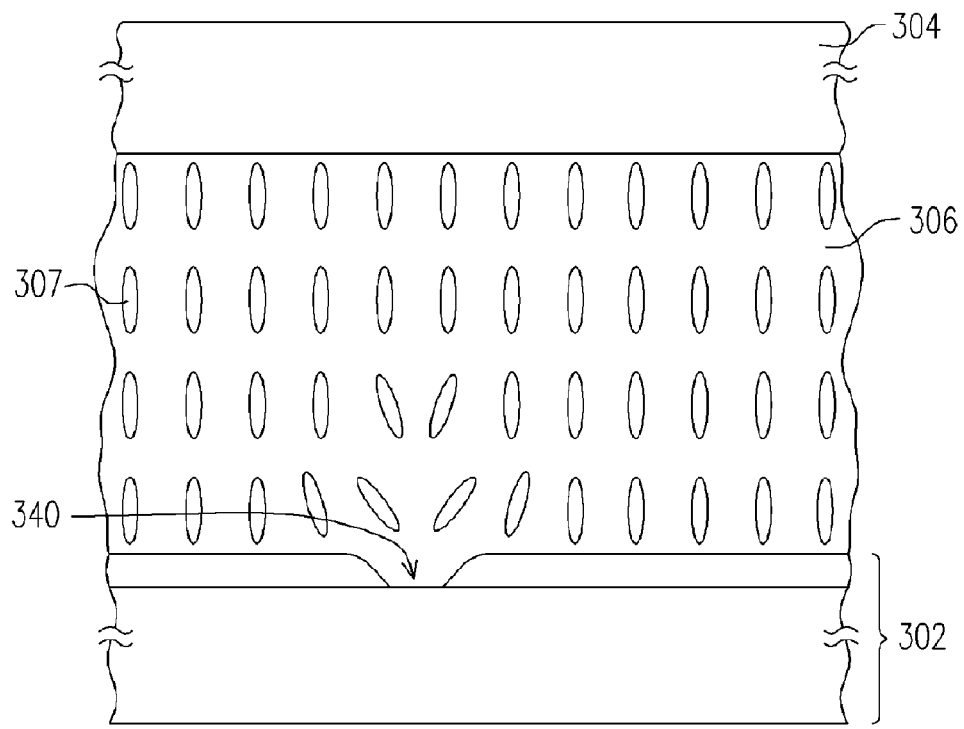
FIG. 5 is a schematic cross sectional view showing the MVA liquid crystal display panel in FIG. 4.

Referring to FIG. 3, the thin film transistor array 302 comprises a substrate 312, a plurality of scan lines 314, a plurality of data lines 316, a plurality of thin film transistors 318, a plurality of pixel electrodes 320 and a plurality of common lines 322. Wherein, the data lines 316 and the scan lines 314 are disposed over the substrate 312 and divide the substrate 312 into a plurality of pixels 326. The thin film transistors 318 and the pixel electrodes 320 are located in the pixels 326, and the thin film transistors 318 are driven by the data lines 316 and the scan lines 314. The pixel electrodes 320 are electrically connected to the thin film transistors 318 corresponding thereto. Wherein, the material of pixel electrodes 320 can comprise indium tin oxide (ITO), indium zinc oxide (IZO) or other transparent conductive material. In particular, as shown in FIGS. 3 and 5, a plurality of second slits 340 are formed on the pixel electrodes 320 of the thin film transistor array 302 to change the electrical field in this area. Therefore, the orientation of the liquid crystal molecules adjacent to the second slit 340 can be changed to extend the view angle of the display panel.

Figure 6:
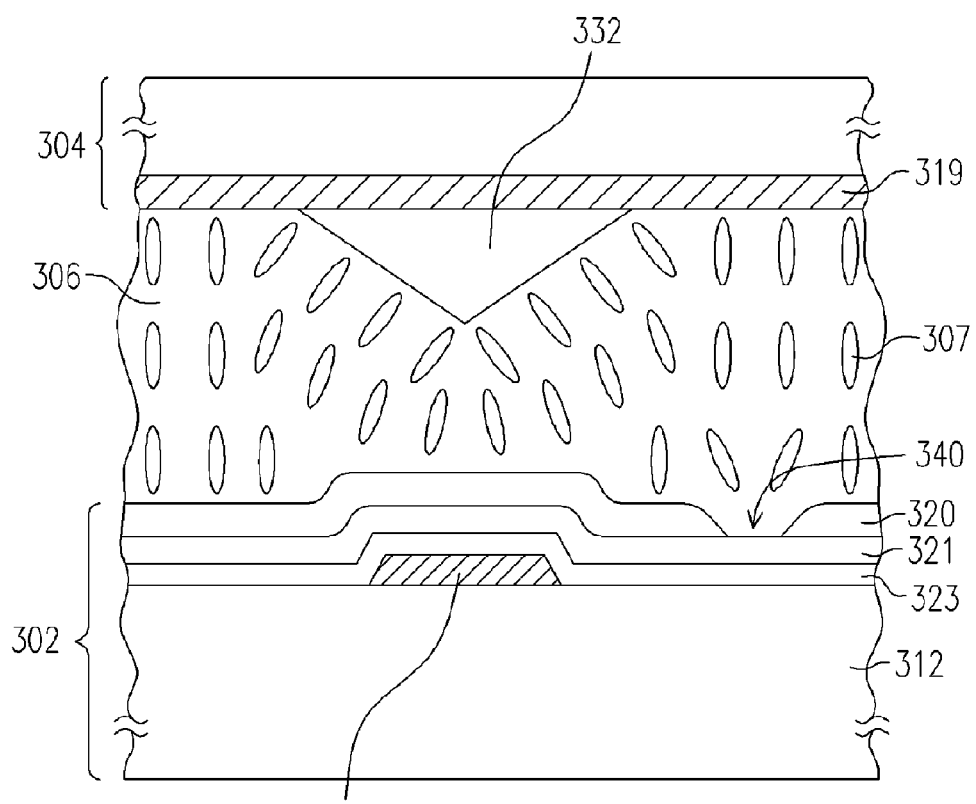
FIGS. 6 and 7 are schematic cross sectional views showing the MVA liquid crystal display panel in FIG. 4 according to two different embodiments of the present invention.
Figure 7:
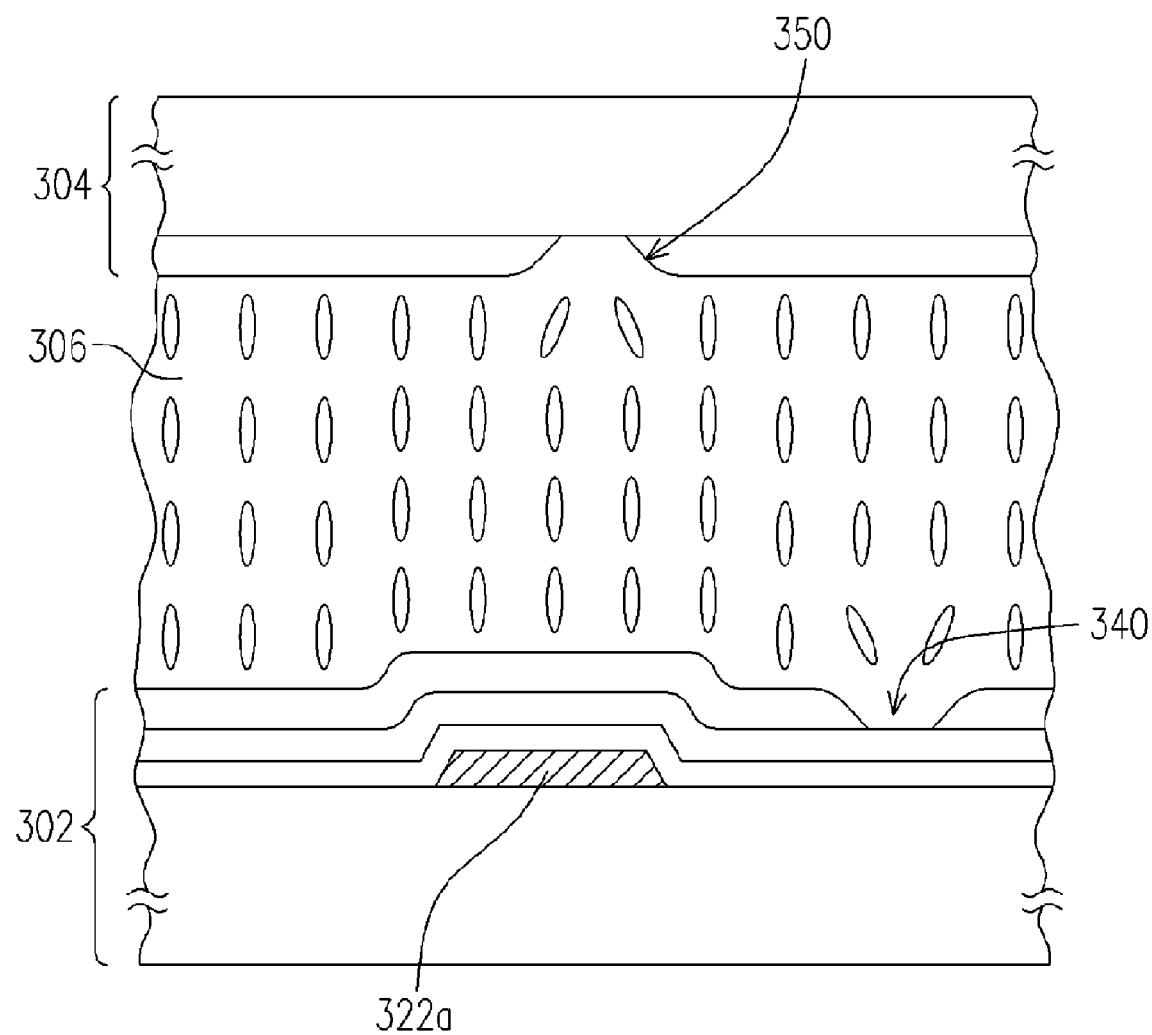

In FIG. 3, the common lines 322 are disposed over the substrate 312. The material of the common lines 322 can be metal. It should be noted that each of the common lines 322 comprises a plurality of the first branches 322a for enhancing capacitance. Further, each of the pixel electrodes 320 covers at least one first branches 322a which is disposed in the pixel area 326 where the luminance quality is bad. As a result, the impact on aperture ratio can be reduced. As shown in FIGS. 6 and 7, the common electrode 319 of the color filter 304 comprises patterns formed thereon. The patterns, for example, are alignment protrusion 332 and/or first slit 350. In this embodiment, the first branches 322a is disposed in a corresponding position to the alignment protrusion 332, as shown in FIG. 6, or to the first slit 350, as shown in FIG. 7. Alternatively, the position of the first branches 322a may be partially corresponding to the alignment protrusion 332 and partially corresponding to the first slit 350. One of ordinary skill in the art can refer to FIGS. 6 and 7 and understand the possible structures and arrangements, so additional drawings are not provided herein.

Figure 1:
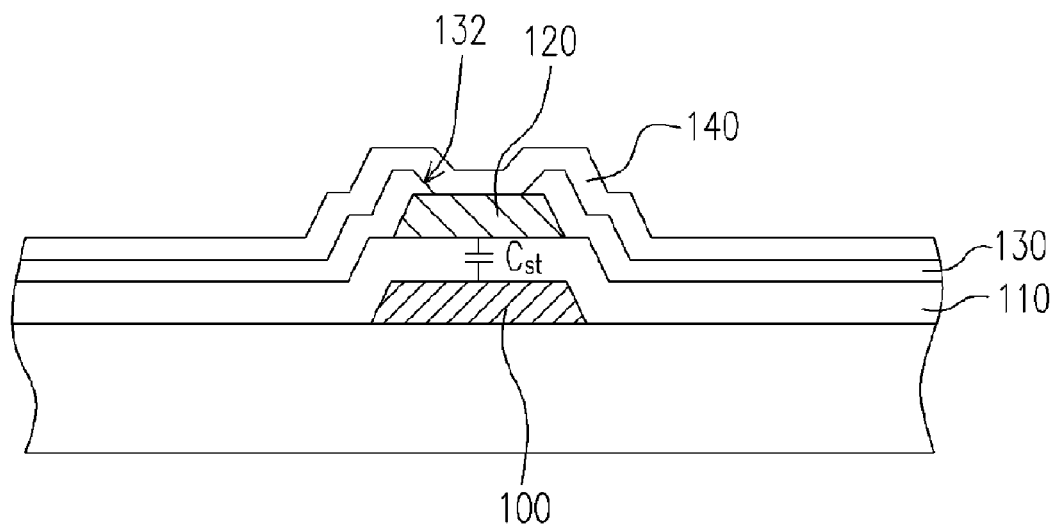
FIG. 1 is a cross sectional view showing a conventional MIM storage capacitor.
Figure 2:
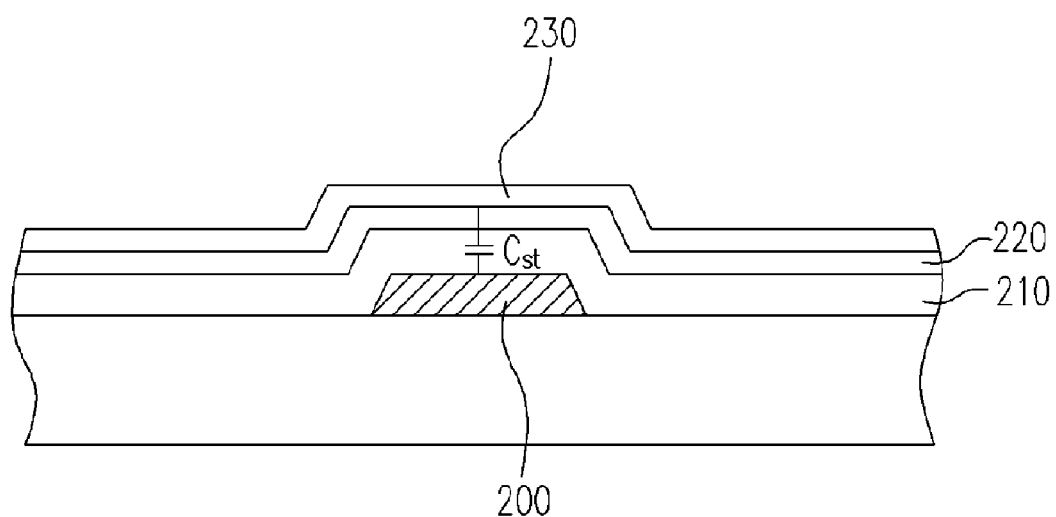
FIG. 2 is a cross sectional view showing a conventional MII storage capacitor.

In the MVA liquid crystal display panel 300, the area of the common line 322 can be made smaller than that of the conventional common line 100 as shown in FIG. 1, such that capacitance leakage of the storage capacitor Cst due to the pollution of particles can be prevented.

Figure 8:
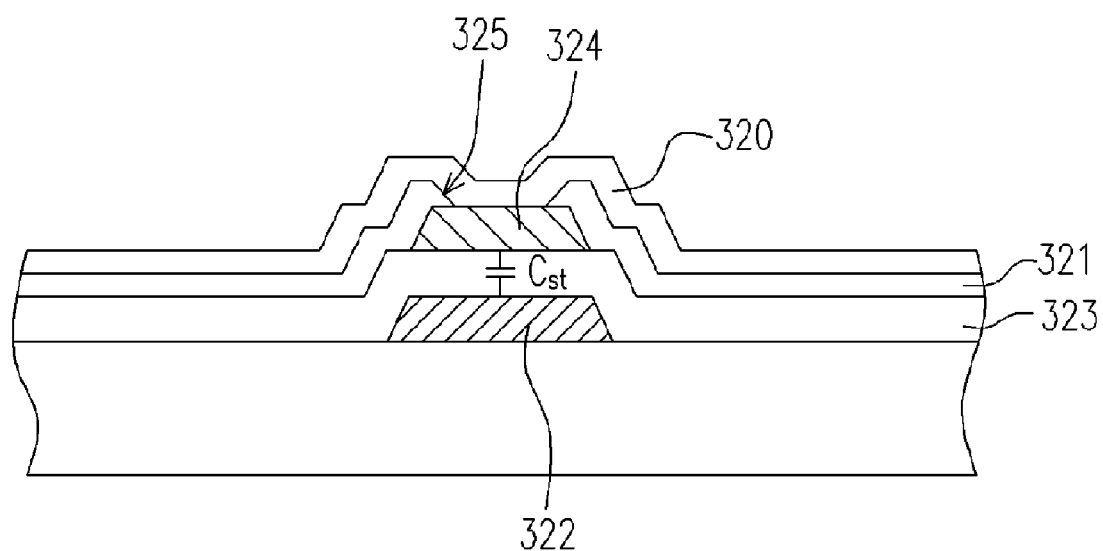
FIG. 8 is a schematic cross sectional view showing a metal-insulator-metal (MIM) storage capacitor structure according to an embodiment of the present invention.
Figure 9:
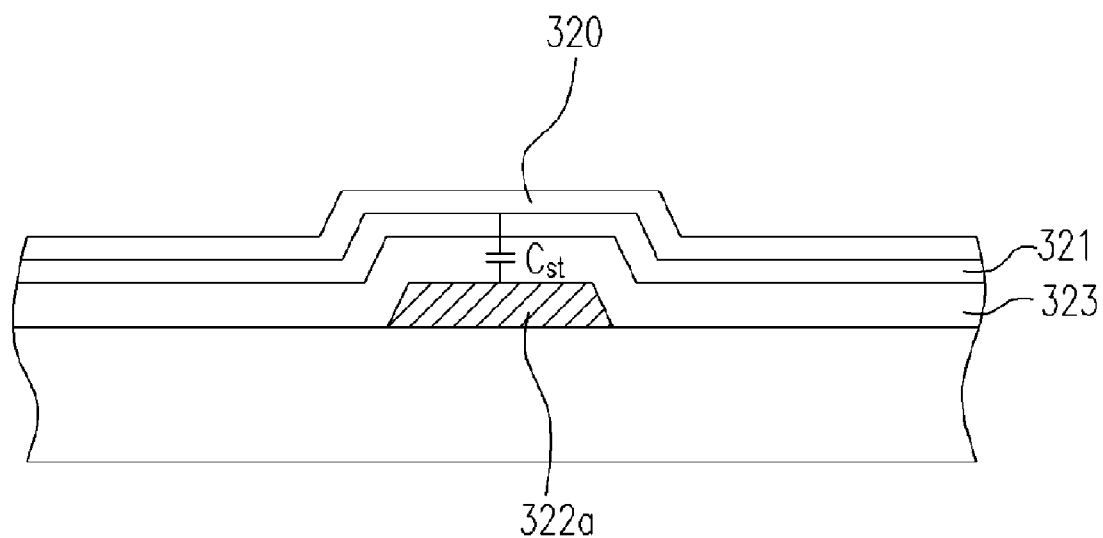
FIG. 9 is a schematic cross sectional view showing a metal-insulator-ITO (MII) storage capacitor structure according to an embodiment of the present invention.

Please refer to FIG. 3, wherein top electrode 324 can also be disposed between the pixel electrode 320 and the common line 322. The top electrode 324 and the data lines 316 can be formed in the same process. The protection layer 321 covers the data lines 316 as well as the top electrode 324. The pixel electrode 320 is electrically connected to the top electrode 324 through the opening 325 in the protection layer 321, as shown in FIG. 8. Accordingly, the common line 322, the protection layer 321 and the top electrode 324 constitute a metal-insulator-metal (MIM) capacitor structure with storage capacitance Cst. On the other hand, if the top electrode 324 does not cover the first branches 322a, then the first branches 322a, the protection layer 321, the gate insulator 323 and the pixel electrode 320 constitute a metal-insulator-ITO (MII) capacitor structure with storage capacitance Cst, as shown in FIG. 9. Further, if the top electrode 324 covers the first branches 322a, then the first branches 322a, the protection layer 321 and the top electrode 324 constitute a MIM capacitor structure, as shown in FIG. 8.

Figure 10:
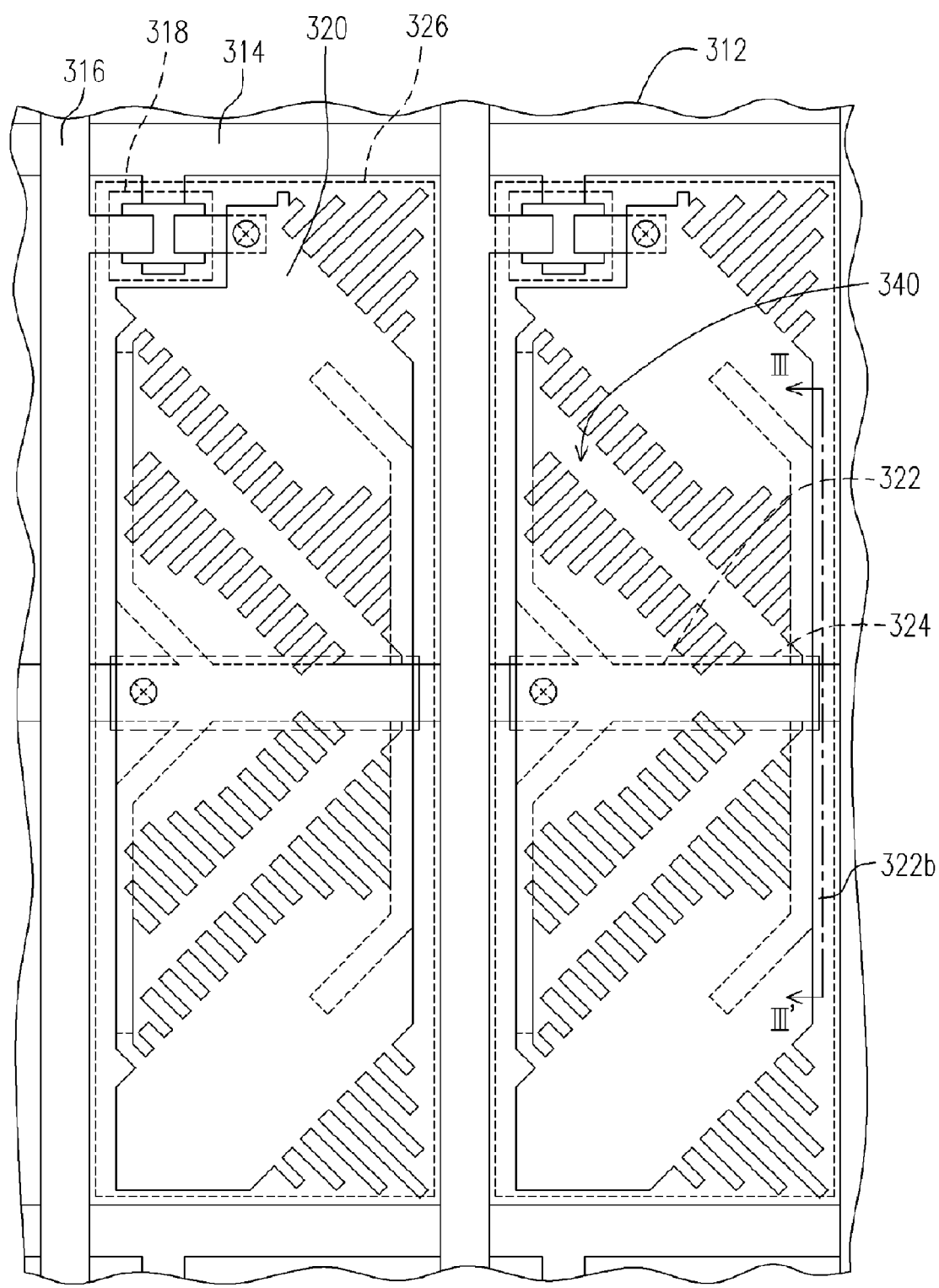
FIG. 10 is a schematic top view showing a thin film transistor array according to another embodiment of the present invention.
Figure 11:
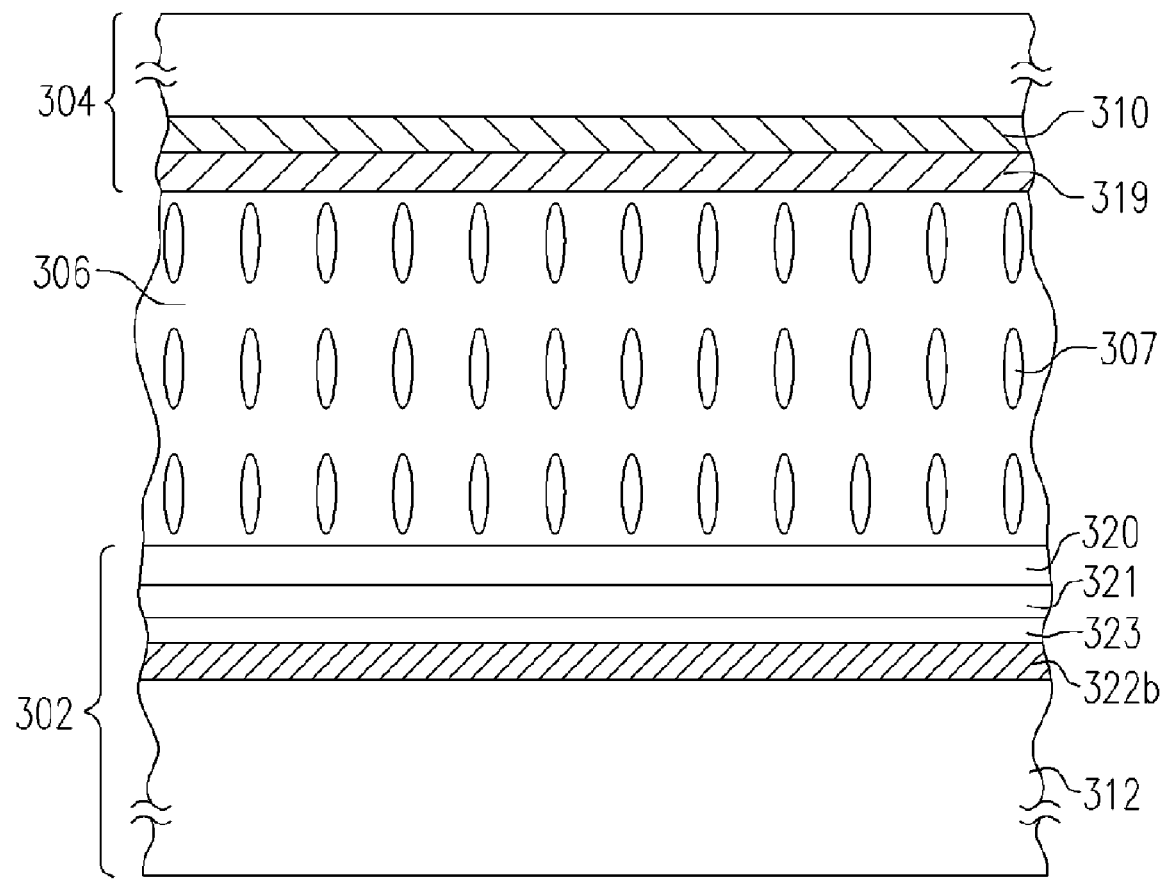
FIG. 11 is a schematic cross sectional view along III-III' in FIG. 10.
Figure 12:
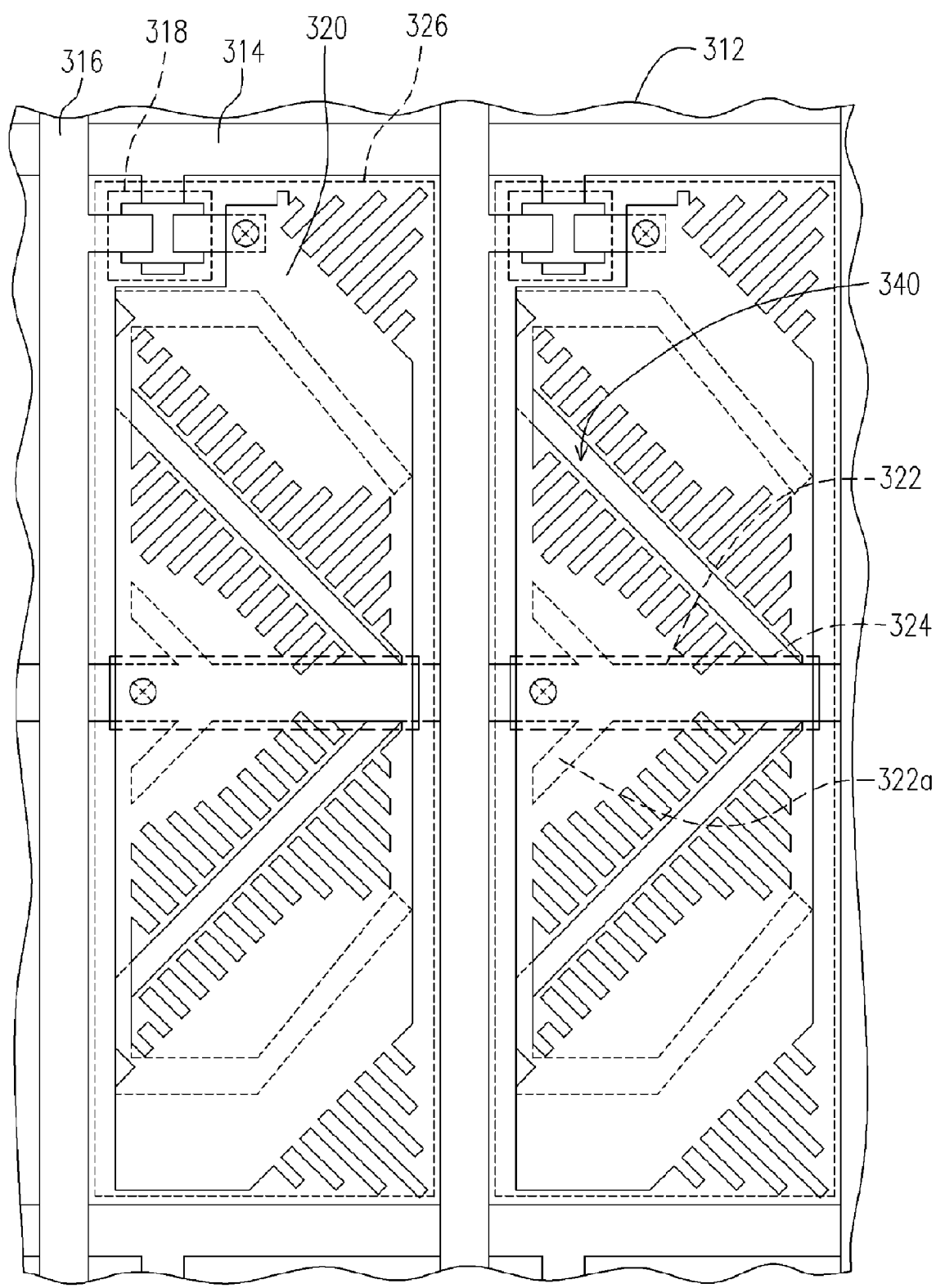
FIGS. 12-19 are configurations showing thin film transistor arrays according to the other embodiments of the present invention.
Figure 13:
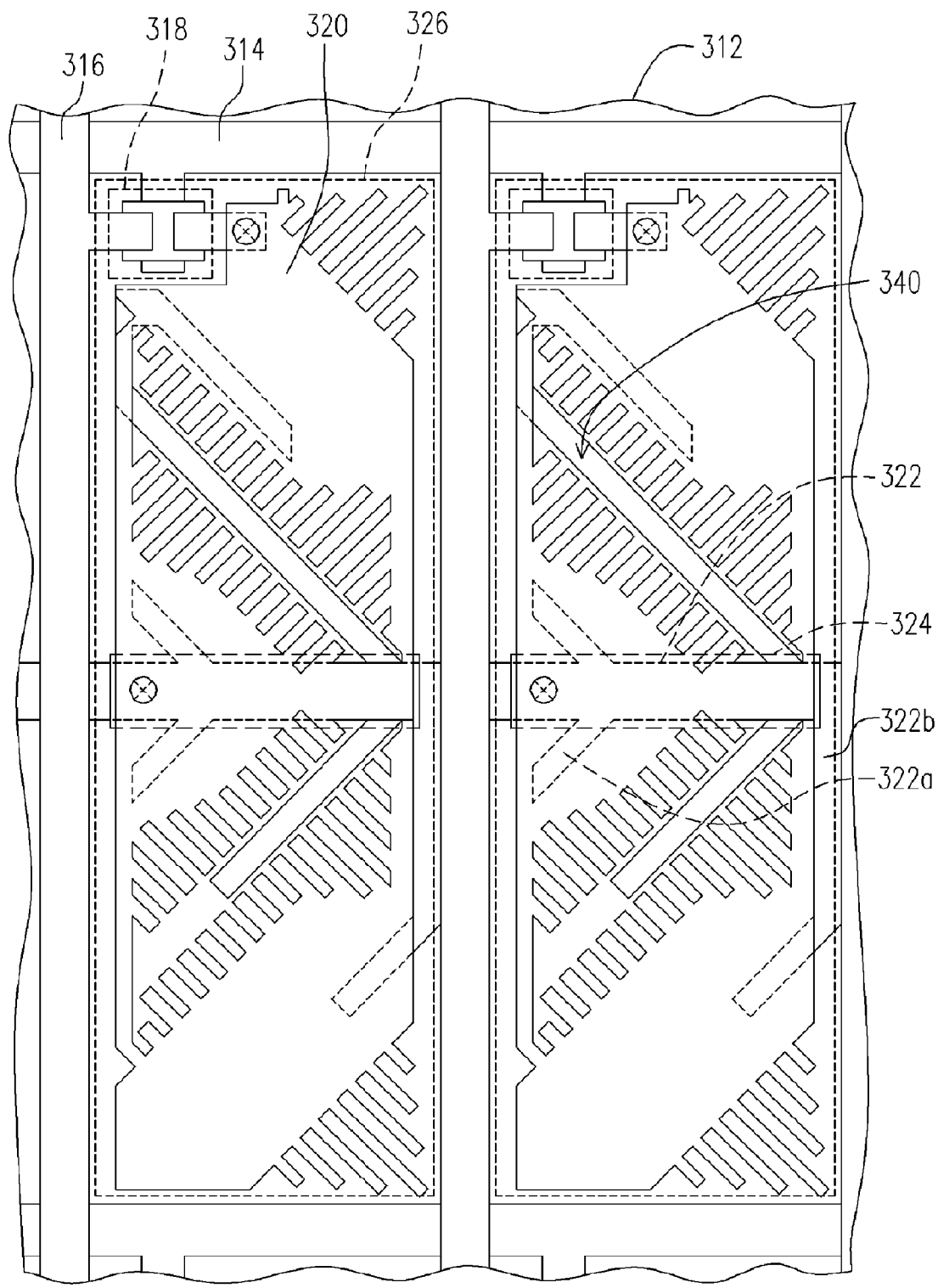
Figure 14:
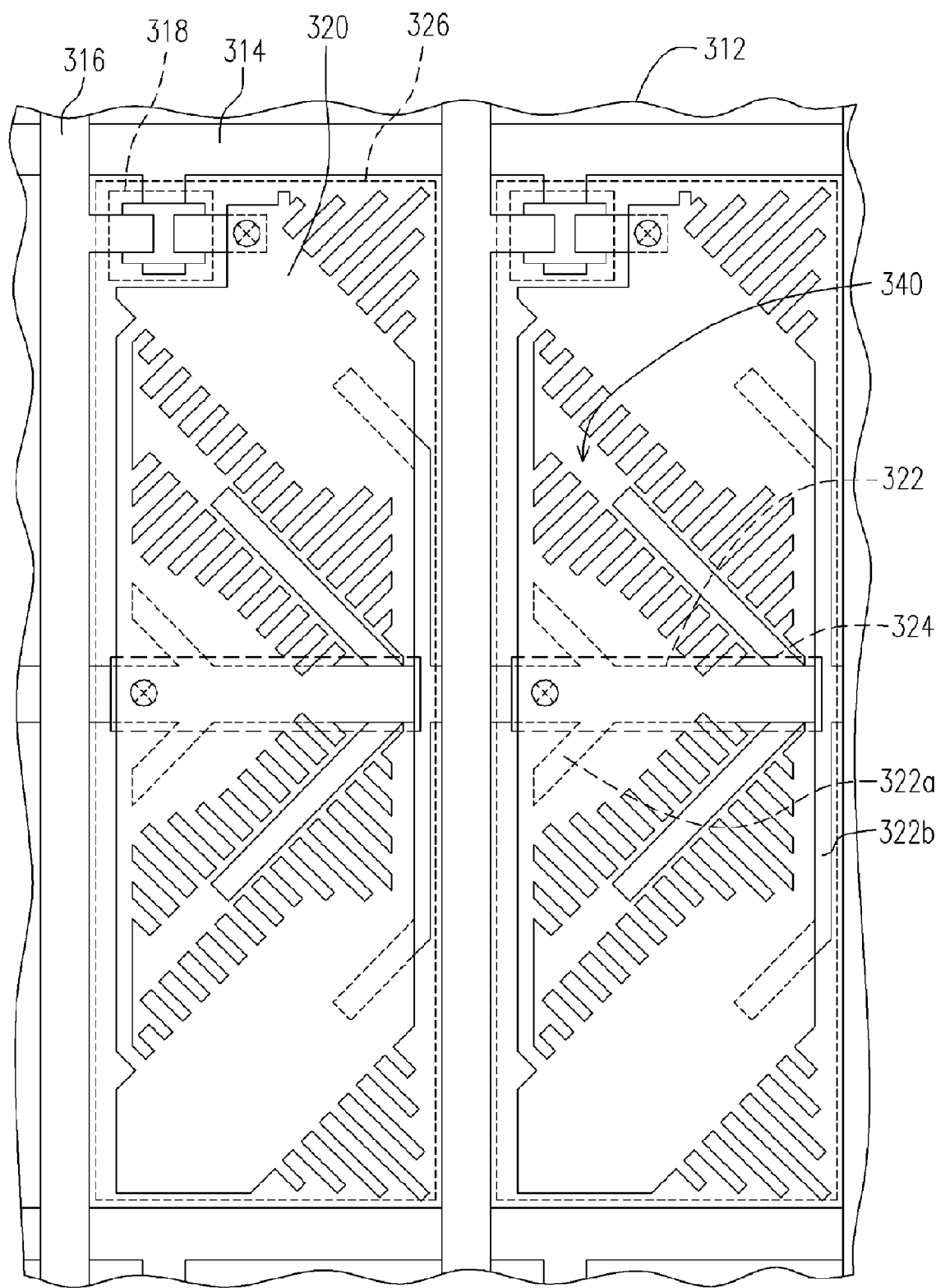
Figure 15:
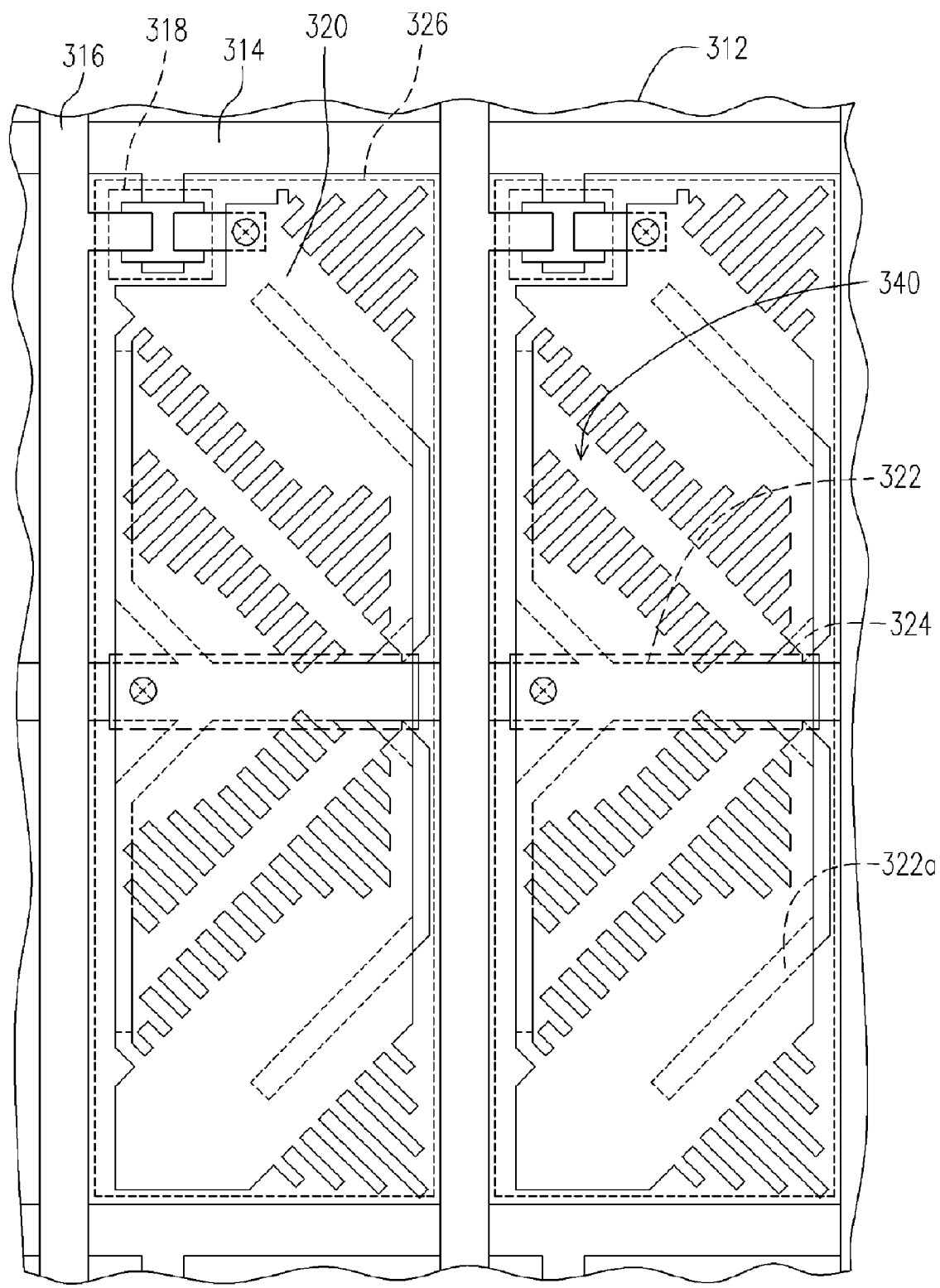
Figure 16:
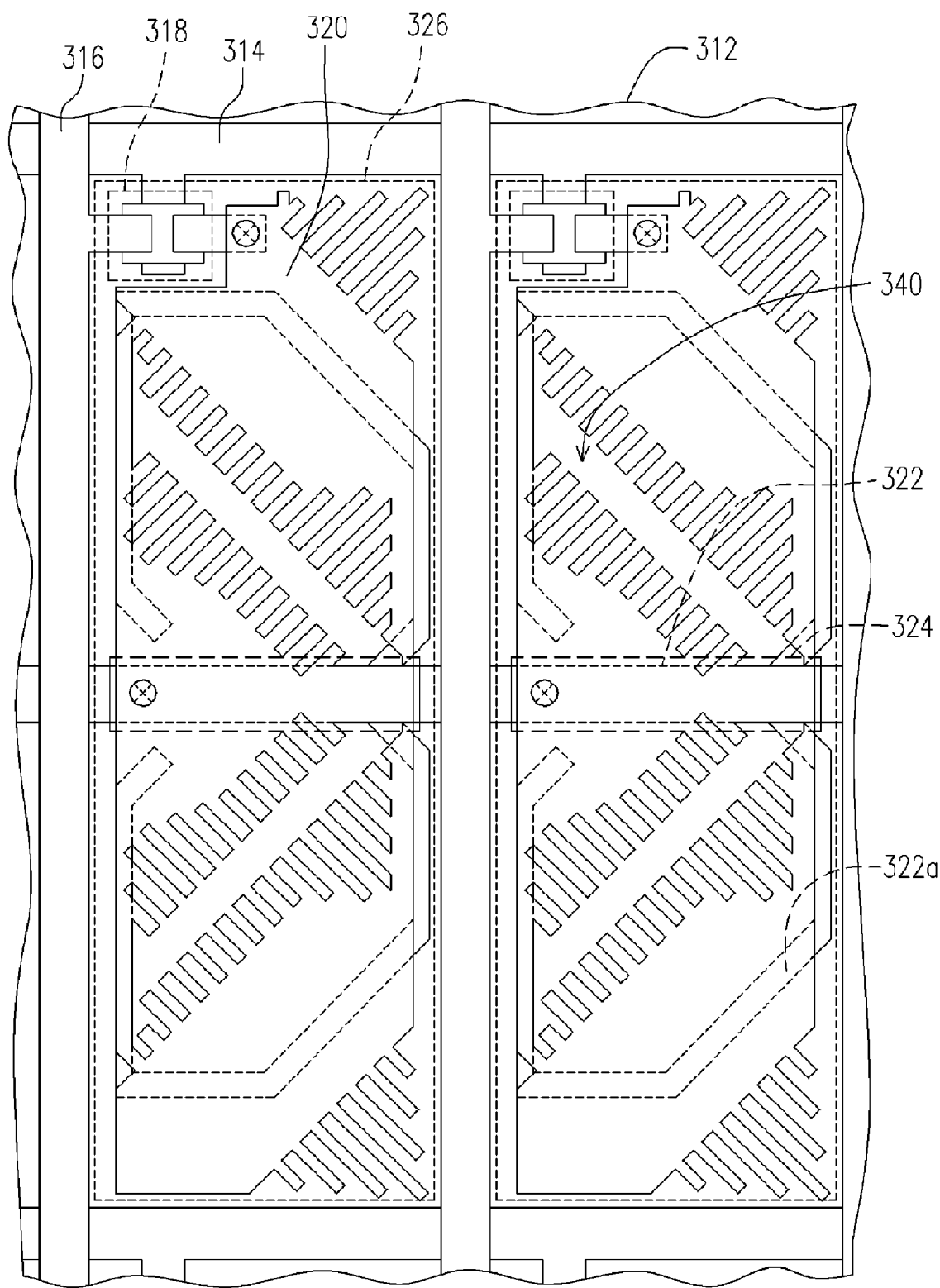
Figure 17:
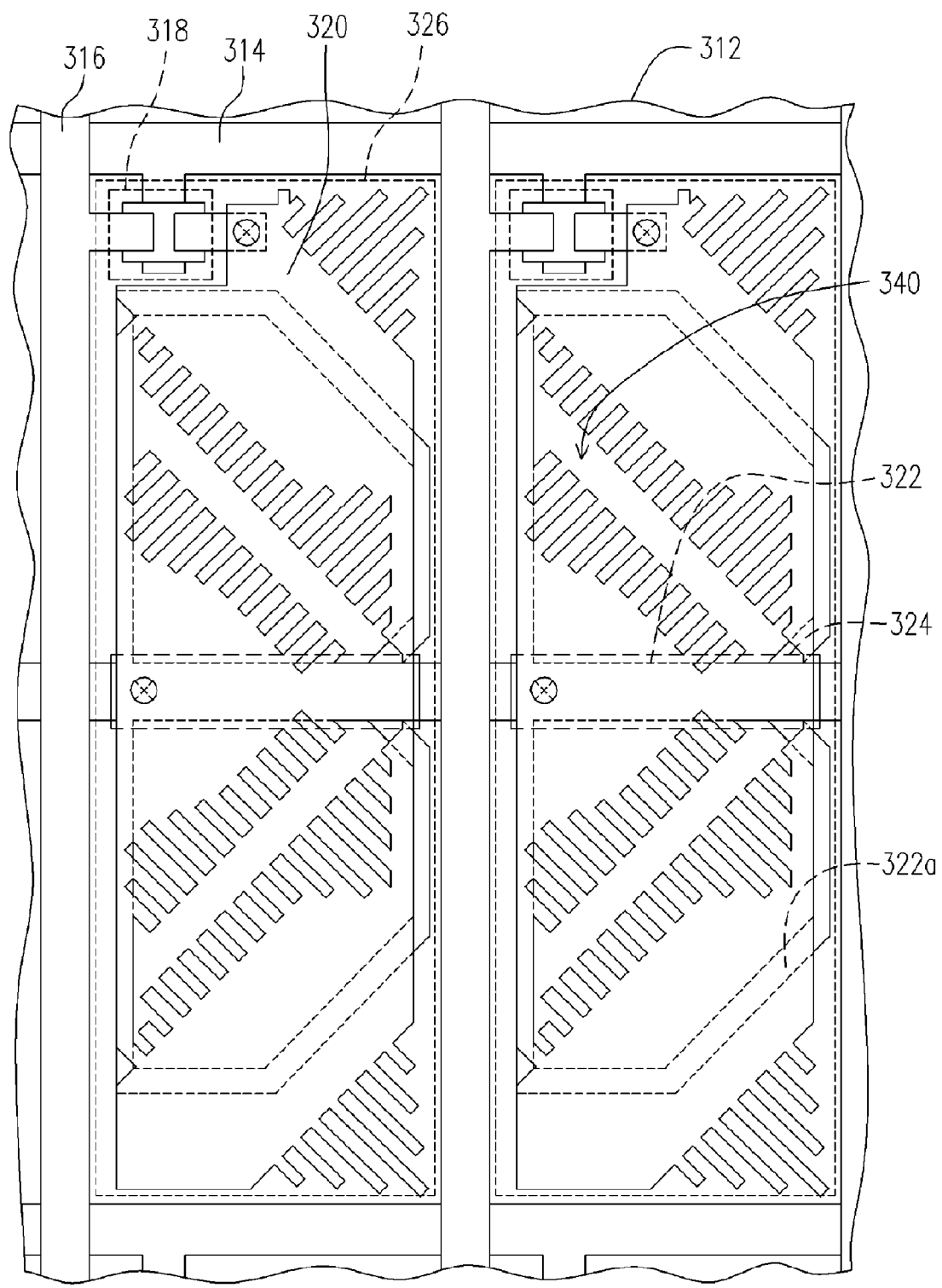
Figure 18:
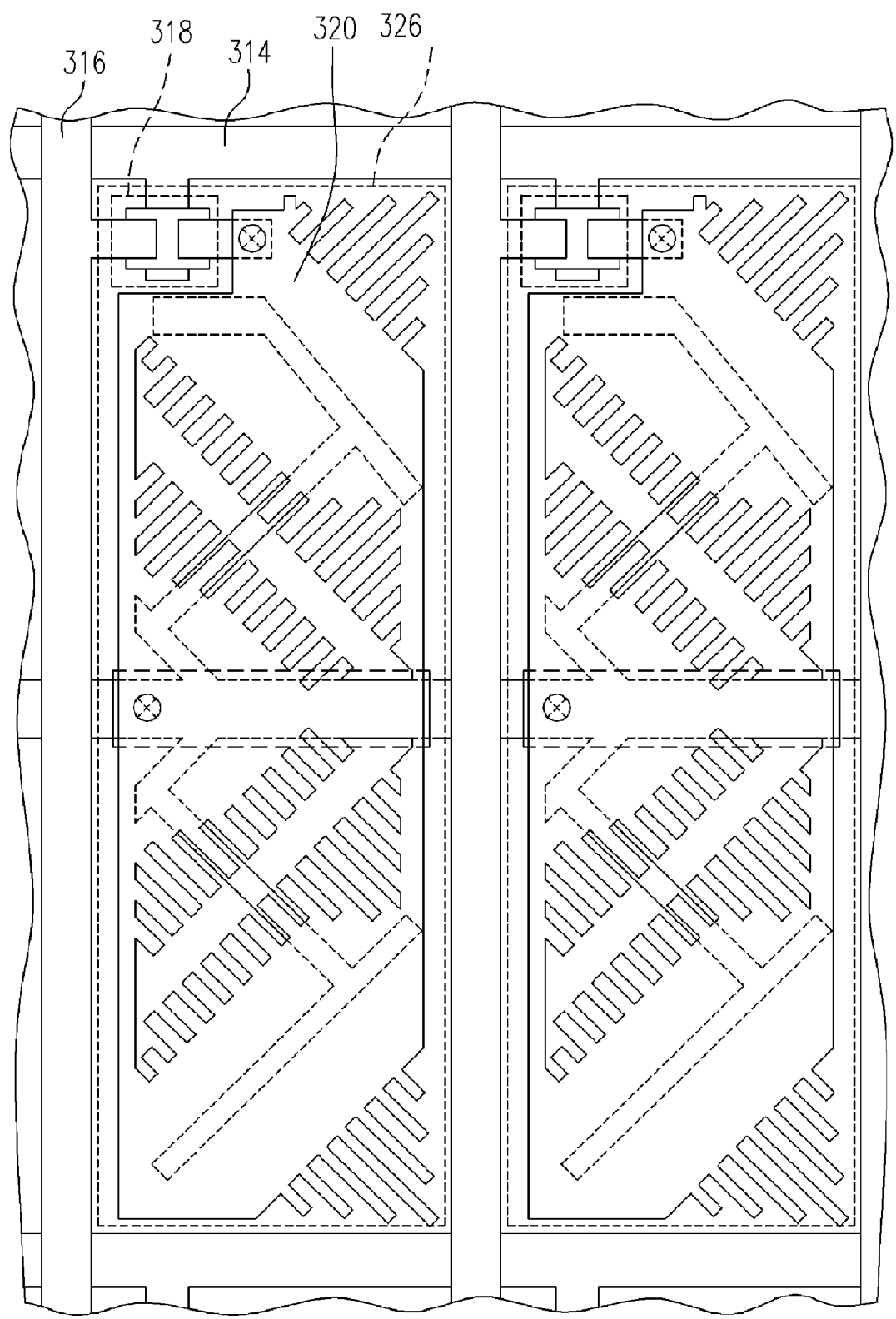
Figure 19:
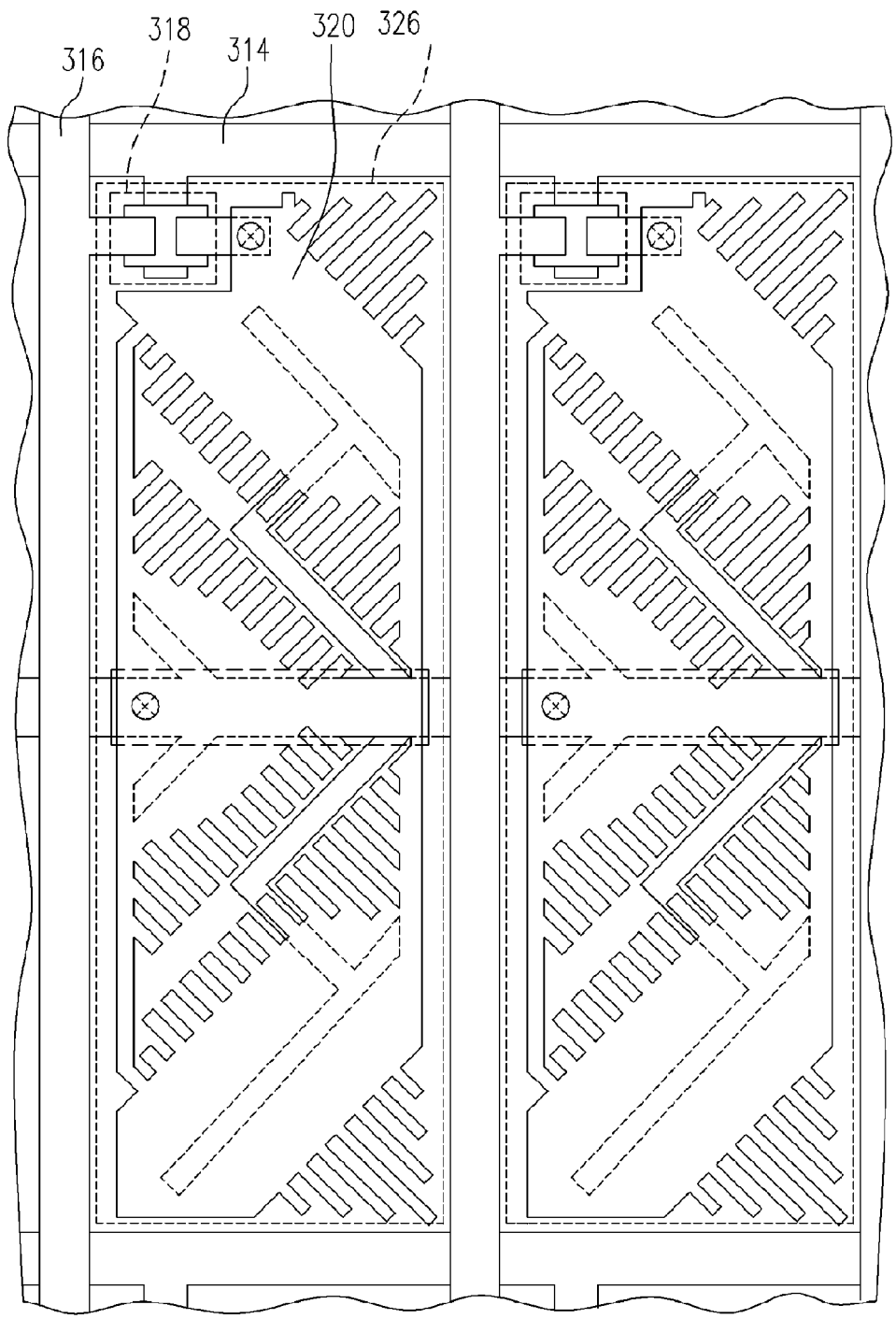

In other embodiments, each of the common lines 322 may further comprise a plurality of second branches 322b. The second branches 322b are disposed in the pixels 326 where the luminance quality is bad. They can be disposed, for example, in areas adjacent to the edge of the pixels 326, as shown in FIG. 10. Alternatively, the second branches 322b can be totally or partially disposed in the pixel electrodes 326. They can also be disposed in areas corresponding to the black matrixes 310 of the color filter 304, as shown in FIG. 11.

It should be noted that the dispositions of the first branches 322a and the second branches 322b of the common lines 322 are not limited. As shown in FIGS. 12-19, the first branches 322a or the second branches 322b of the common lines 322 can be disposed in various patterns. In some embodiments shown in FIGS. 15-17, the first branches 322a or the second branches 322b are disposed away from the second slit 340.

Accordingly, in the present invention, the branches of the common lines are used to enhance the capacitance of the capacitors in the liquid crystal display panels. Therefore, even if the area of the common lines is reduced, the capacitance lost due to the reduced area of the common lines can be compensated by adding branches. Therefore, in the present invention, the area of the common lines is reduced to prevent the capacitance leakage of the capacitors. It should be noted that when the capacitance leakage occurs at the branches of the common lines, the branches which cause the leakage can be cut off in a repairing process. Accordingly, the yield of the liquid crystal display panel can be improved.

In one embodiment of the present invention, the branches of the common lines are disposed in pixels where the luminance quality is bad. Accordingly, the disposition of the branches in the pixels will not alter the aperture ratio. In other words, in the present invention, the capacitance of the pixels is enhanced without altering the aperture ratio. Accordingly, the liquid crystal display panel of the present invention has the desired aperture ratio and the desired capacitance so the performance of the liquid crystal display panel can be improved.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A thin film transistor array which, along with a color filter and a liquid crystal layer, constitutes a liquid crystal display panel, wherein a plurality of patterns are disposed beneath the color filter, the thin film transistor array comprising:
    a substrate;
    a plurality of scan lines disposed over the substrate;
    a plurality of data lines disposed over the substrate, wherein a plurality of pixels are defined by the scan lines and the data lines;
    a plurality of thin film transistors disposed on the substrate, wherein each of the thin film transistors is disposed in one of the pixels;
    a plurality of pixel electrodes disposed over the substrate, wherein each of the pixel electrodes is disposed in one of the pixels and electrically connected in response to one of the thin film transistors; and
    a plurality of common lines disposed over the substrate, wherein each of the common lines is disposed between two adjacent scan lines, each of the common lines comprising a plurality of first branches, wherein each of the pixel electrodes covers at least one of the first branches, and each of the first branches is substantially overlapped and aligned to one of the patterns.

2. The thin film transistor array of claim 1, further comprising a plurality of top electrodes, wherein each of the top electrodes is disposed between the pixel electrodes and the common lines, and a part of the top electrodes is electrically connected to one of the pixel electrodes.

3. The thin film transistor array of claim 1, wherein each of the common lines further comprises at least a second branch, and the second branch is disposed adjacent to an edge of the pixels.

4. The thin film transistor array of claim 3, wherein the second branch is substantially overlapped and aligned to a plurality of black matrixes of the color filter.

5. The thin film transistor array of claim 1, further comprising a gate insulator disposed over the substrate and covering the common lines.

6. The thin film transistor array of claim 1, further comprising a protection layer over the substrate and covering the data lines.

7. The thin film transistor array of claim 1, wherein the pixel electrodes have at least one second slit.

8. The thin film transistor array of claim 7, wherein the first branches are disposed away from the second slit.

9. A liquid crystal display panel, comprising:
    a color filter having a plurality of patterns;
    a thin film transistor array, comprising:
        a substrate;
        a plurality of scan lines disposed over the substrate;

a plurality of data lines disposed over the substrate, wherein a plurality of pixels are defined by the scan lines and the data lines;

a plurality of thin film transistors disposed over the substrate, wherein each of the thin film transistors is disposed in one of the pixels;

a plurality of pixel electrodes disposed over the substrate, wherein each of the pixel electrodes is disposed in one of the pixels and electrically connected in response to one of die thin film transistors;

a plurality of common lines disposed over the substrate, wherein each of the common lines is disposed between two adjacent scan lines, each of the common lines comprising a plurality of first branches, wherein each of the pixel electrodes covers at least one of the first branches, and each of the first branches is substantially overlapped and aligned to one of the patterns; and a liquid crystal layer disposed between the color filter and the thin film transistor array.

* * * * *